United States Patent

[11] 3,584,263

[72] Inventors Francis T. Thompson
Murrysville;
Wardell Gary, Beaver, both of, Pa.
[21] Appl. No. 732,721
[22] Filed May 28, 1968
[45] Patented June 8, 1971
[73] Assignee Westinghouse Electric Corporation
Pittsburgh, Pa.

[54] TRANSFORMLESS SOLID-STATE ON-DELAY TIMER
21 Claims, 5 Drawing Figs.

[52] U.S. Cl. .............................................. 317/141,
307/252, 307/293, 307/305, 317/148.5
[51] Int. Cl. ...................................................... H01h 47/18,
H01h 47/32
[50] Field of Search .......................................... 307/293,
301; 317/142, 148.5, 148.5 B

[56] References Cited
UNITED STATES PATENTS
3,181,032  4/1965  Myers ............................. 317/33
3,144,568  8/1964  Silliman et al. ................. 307/132
3,351,814  11/1967 Riebs ............................... 317/36
3,486,041  12/1966 Thompson ....................... 307/252
3,244,965  4/1966  Gutzwiller ...................... 307/301 X
3,333,175  7/1967  Klyce ............................. 318/487
3,417,297  12/1968 Wallentowitz ................... 317/148.5
3,483,395  12/1969 Sauber ............................ 307/141

Primary Examiner—Lee T. Hix
Assistant Examiner—C. L. Yates
Attorneys—A. T. Stratton, C. L. McHale and M. I. Hull ABSTRACT: An on-delay timer circuit includes a full wave rectifier for obtaining a full wave rectified voltage from an alternating current line, adapted to have a relay coil in series with the input to the full wave rectifier, and having a controlled rectifier connected across the output of the full wave rectifier to provide a switch for controlling current through the coil. A unijunction transistor, or a pair of complementary PNP and NPN transistors, control the firing of the controlled rectifier. A power supply capacitor is charged both from the full wave rectified voltage and with an additional half wave voltage obtained from a diode. A resistor interconnecting the power supply capacitor and the full wave rectifier is automatically switched from a capacitor charging resistor to a capacitor discharging resistor when the controlled rectifier fires. A timing capacitor controlling the firing of the unijunction transistor and hence that of the controlled rectifier is reset by using an additional transistor to control the conduction of an additional diode in the timing capacitor discharge or reset path, the additional transistor having its base-emitter junction connected in series with a voltage regulating Zener diode. The power supply capacitor charging current is utilized to generate voltage pulses for pulsing the timing capacitor.

PATENTED JUN 8 1971

3,584,263

WITNESSES:
Bernard R. Giegusy
James T. Young

INVENTORS
Francis T. Thompson &
Wardell Gary.
BY Maury J. Hull
ATTORNEY 3,584,263

TRANSFORMLESS SOLID-STATE ON-DELAY TIMER

CROSS-REFERENCE TO RELATED APPLICATIONS

This application is related to the following copending applications: I. D. Watson, "Off-Delay Apparatus," Ser. No. 625,762, filed Mar. 24, 1967; W. Gary, "Solid-state On-Delay Time Delay Apparatus," Ser. No. 732,631, filed May 28, 1968; —W. Gary "Off-Delay Solid-State Time Delay Apparatus," Ser. No. 732,720, filed May 28, 1968; G. Watson, "Internally Generated Auxiliary Direct Current Voltage Source for a Controlled Rectifier Alternating Current Switch," Ser. No. 735,226, filed June 7, 1968; Thompson, "Semiconductor Time Delay Circuits;" Ser. No. 571,631, filed Aug. 10, 1966, all of the foregoing copending applications being assigned t the assignee of the present invention.

BACKGROUND OF THE INVENTION

1. Field of the Invention

The invention relates to time delay circuits employing a combination of solid-state devices including Zener and other diodes, transistors, and controlled rectifiers for producing a time delay and for resetting a timing circuit either after a timing operation is completed or when the power is interrupted before the circuit times out.

2. Description of the Prior Art

Solid-state on-delay and off-delay time delay circuits are old in the art as exemplified in FIGS. 13.29 through 13.33, "G.E. Transistor Manual," 7th Edition. Representative of the state of the art include: U.S. Pat. Nos. 3,365,586; 2,968,770; and 3,107,320. Other United States patents of the prior art will be found mentioned in the aforementioned copending applications of W Gary.

However, some of the prior art circuits have not achieved maximum utilization of any particular component or components and the circuit of the present application does achieve such maximum utilization by novel means summarized in the aforegoing Abstract of the Disclosure.

SUMMARY OF THE INVENTION

An on-delay timer circuit includes a full wave rectifier operatively connected to the alternating current line for obtaining a full voltage. A power supply capacitor is charged from the full wave voltage through a resistor, and is additionally charged by a half wave voltage through a diode connected to the alternating current line. A timing capacitor controls the voltage on the emitter of a unijunction transistor, one of the bases of which supplies a triggering signal to a controlled rectifier connected across the output of the full wave rectifier. A transistor in combination with a diode and a Zener diode provide for rapid discharge of the timing capacitor in the event the alternating current line is interrupted before a timing operation is completed, and also for rapid resetting of the circuit after a timing out is completed.

DESCRIPTION OF THE PREFERRED EMBODIMENT

Figure 1:
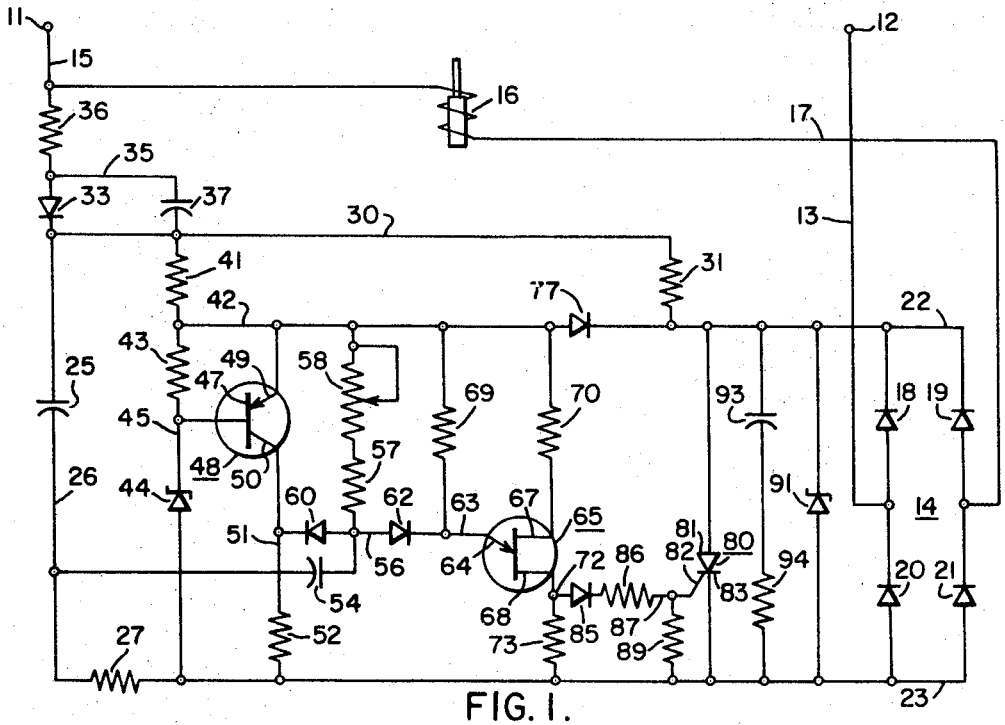
FIG. 1 is an electrical schematic circuit diagram according to the preferred embodiment of our invention.

In FIG. 1, terminals 11 and 12 are connected to an alternating current line. Making the electrical connection to the alternating current line initiates a timing operation, as will be seen more fully hereinafter. By way of lead 13, terminal 12 is connected to a full wave rectifier generally designated 14 to supply an input thereto and terminal 11 is connected by way of lead 15, coil winding 16 and lead 17 to the input of the full wave rectifier 14. The full wave rectifier generally designated 14 is seen to include diodes 18, 19, 20 and 21 supplying a full wave rectified output to leads 22 and 23, lead 22 being positive with respect to lead 23.

A power supply capacitor 25, which may have a capacity of 5 microfarads and may be of a type known in the trade as Mylar 200 volts, is seen to be connected by way of lead 26 and resistor 27, which may have a value of 10 ohms to the aforementioned lead 23. Power supply capacitor 25 is seen to have two charging paths, one by way of lead 30 and resistor 31, which may have a value of 4 kilohms and which is connected to the aforementioned lead 22. The other charging path for capacitor 25 is by way of lead 30, diode 33, which may be a type known in the trade as 1N822, lead 35 and resistor 36, which may have a value of 3.5 kilohms, and thence to the aforementioned lead 15 and terminal 11. Capacitor 37, which may have a value of 0.047 microfarads, is connected in parallel with diode 33 to provide transient protection for the diode.

The aforementioned lead 30 is connected by way of resistor 41, which may have a value of 6 kilohms, lead 42, resistor 43, which may have a value of 1.2 kilohms, lead 45, and Zener diode 44 to lead 23. The Zener diode 44 may be a type known in the trade as 1N965B and have a Zener voltage of 15 volts.

The lead 45 which connects Zener diode 44 with resistor 43 is also connected to the base 47 of a PNP transistor generally designated 48 having an emitter 49 and collector 50. Emitter 49 is directly connected to the aforementioned lead 42. Collector 50 is connected by way of lead 51 and resistor 52 to lead 23. Resistor 52 may have a value of 7.5 kilohms.

The aforementioned timing capacitor is seen at 54 and may have a value of 5 microfarads, may be a Mylar with a 50 volt rating, and has one terminal connected to the aforementioned lead 26 and the other terminal thereof connected by way of lead 56, resistor 57, which may have a value of 10 kilohms, and variable resistor 58, which may have a total value of 10 megohms to the aforementioned lead 42. The aforementioned lead 56 is connected by way of diode 60 to the aforementioned lead 51 and collector 50 of transistor 48. Diode 60 may be a type known in the trade as 1N457.

The aforementioned lead 56 and accordingly one terminal of the timing capacitor 54 is also connected by way of diode 62 and lead 63 to the emitter 64 of a unijunction transistor generally designated 65. The unijunction transistor has based 67 and 68, base 67 being connected by way of resistor 70, which may have a value of 1 kilohm, to the aforementioned lead 42, and base 68 being connected by way of lead 72 and resistor 73, which may have a value of 47 ohms, to the aforementioned lead 23.

The aforementioned emitter 64 and lead 63 are also connected by was of resistor 69, which may have a value of 15 megohms, to the aforementioned lead 42. Lead 42 is connected by way of diode 77 to the aforementioned lead 22.

As will be seen more fully hereinafter, the aforementioned base 68 of the unijunction transistor generally designated 65 supplies a gate or switching signal to a controlled rectifier generally designated 80 having an anode 81, control element 82 and cathode 83. This gating or switching current or signal is taken by way of the aforementioned lead 72, diode 85, resistor 86 and lead 87 to the aforementioned control element 82. Diode 85 may be a type known in the trade as 1N457 and resistor 86 may have a value of 390 ohms. Lead 87 and control element 82 are also connected by way of resistor 89 to lead 23. Resistor 89 may have a value of 220 ohms. The cathode 83 of the controlled rectifier generally designated 80 is connected to the aforementioned lead 23 and the anode 81 is connected to the aforementioned lead 22.

Connected in parallel with the anode-cathode path of the controlled rectifier is the Zener diode 91 which has a Zener voltage of 200 volts and which may be of a type known in the trade as 1N3051. Also connected in parallel with the controlled rectifier are the series connected capacitor 93 and resistor 94. Capacitor 93 may have a value of 0.003 microfarads and resistor 94 may have a value of 10 ohms.

The operation of the circuit of FIG. 1 may best be described with respect to certain objects of the invention and further with respect to the operation of the unijunction transistor generally designated 65 which controls the application of the gating signal to the controlled rectifier generally designated 80. Objects of the invention include protection against transients and spurious triggering; when the input power is turned off after timing out the circuit resets quickly and provides rated timing accuracy of plus or minus 2 percent following a resetting period as short as 80 milliseconds; when power is interrupted prior to timing out the circuit does not energize the output but resets and provides rated timing accuracy within 250 milliseconds.

It will be understood that controlled rectifier 80 is not turned on immediately after connection of terminals 11 and 12 to the alternating current line; a time interval elapses after connection during which capacitor 54 charges. During this time interval the full wave rectifier 14 has an output, which is used to charge power supply capacitor 25 and timing capacitor 54.

The operation of the unijunction transistor 65 is somewhat similar to a unijunction transistor utilized in the timing circuit of FIG. 13.30 of the aforementioned 7th edition of the Transistor Manual. Disregarding for the moment the effect of certain other components the timing interval of the circuit of FIG. 1 is initiated by applying power to the circuit of terminals 11 and 12. As soon as capacitor 25 charges, voltage appears across the unijunction transistor bases 67 and 68 following a path from lead 22 through resistor 31 and 30, through resistor 41, lead 42 and resistor 70 to base 67 and thence through base 68 and resistor 73 to the aforementioned negative lead 23 of the full wave rectifier. Lead 23 is connected by way of resistor 27 and lead 26 to power supply capacitor 25. Timing capacitor 54 is charged through a path including lead 26, and lead 56, resistors 57—58 and lead 42. The emitter voltage on emitter 64 rises slowly at a rate determined by timing resistors 57—58 and timing capacitor 54, since emitter 64 is connected by diode 62 to lead 56. When the emitter voltage at 64 reaches a specified fraction of the voltage between base 67 and base 68, the unijunction triggers on and discharges the capacitor 54 through the isolating diode 62 and through the resistor 86 and the control element 82 of the controlled rectifier 80 causing the controlled rectifier to conduct. This energizes the load, in this case the coil 16 of a relay, which is shown integral with the circuit for convenience of illustration but which may be coil of any suitable relay winding which it is desired to control by the timing circuit.

It will be understood that under normal conditions, while capacitor 54 is charging, the Zener diode 44 conducts and the base-emitter junction of transistor 48 conducts and regulates the voltage supplied to the unijunction transistor. Furthermore, this base to emitter current keeps transistor 48 saturated which reverse-biases diode 60 rendering it nonconductive.

With respect to the operation of the circuit of FIG. 1 to provide rapid resetting of the power supply, diode 33 charges power supply capacitor 25 directly from the 155 volt alternating current line through current limiting resistor 36 and also through resistor 27. Rapid resetting dictates the use of a low value capacitance for 25 which is in fact stated hereinbefore to be 5 microfarads. Excessive ripple voltage would normally result from the half wave charging of capacitor 25 through diode 33 in the absence of other circuit features. Furthermore, without additional circuit features to be described in more detail, capacitor 25 would discharge to too low a voltage to permit obtaining a well regulated supply voltage for the timing circuit.

In the circuit of our invention the full wave rectified voltage available from the output bridge of the alternating current switch 14—80 is also used in charging capacitor 25. This voltage charges capacitor 25 through resistor 31 and resistor 27 and greatly reduces the ripple voltage across capacitor 25. This permits good regulation of the supply voltage to the unijunction transistor 65 and therefore aids in accurate timing.

A further object of the invention was the provision of controlled rectifier holding current without excessive power dissipation. In prior art devices once the controlled rectifier has been fired, it is necessary to provide a direct current to the controlled rectifier anode to prevent the controlled rectifier from blocking when the alternating current in the relay coil goes to zero each one one-hundred and twentieth second. In a transformerless circuit this direct current provided to the anode of the controlled rectifier is derived from line voltage and therefore produces considerably more dissipation than if obtained from a low voltage source. As will be seen more fully hereinafter, in our circuit less current is required for holding the controlled rectifier in the conducting state than is required for proper regulation of the unijunction voltage supply during the timing period (prior to firing the controlled rectifier).

In conventional prior art circuits, since the controlled rectifier anode is virtually at ground potential after firing, the power supply tends to supply more current than it supplies prior to firing. The power dissipation is therefore higher after firing which is unfortunate since it adds to the dissipation within the timer unit. Power dissipation is particularly important in the present application of the timing circuit because small size is one of the requirements.

We have overcome the prior art problem of excessive power dissipation in the following manner: During the timing period (prior to firing the controlled rectifier) power supply capacitor 25 is supplied half wave current through resistor 36 and is supplied full wave current through resistor 31. After the controlled rectifier is fired, the full wave voltage is automatically removed (short circuited by the controlled rectifier) and only the half wave charging current from the resistor 36 source is active in supplying pulsating half wave direct current to the capacitor 25. The direction of direct current flow actually reverses in resistor 31 which, after the controlled rectifier is fired, is effectively in parallel with resistor 41 and diode 77 which supply the holding current to the controlled rectifier. Automatically removing the full wave direct current source to the power supply capacitor 25 reduces the direct current drain and therefore reduces power dissipation. Furthermore, resistor 31 provides damping for the relay coil inductance of winding 16.

Figure 2A:
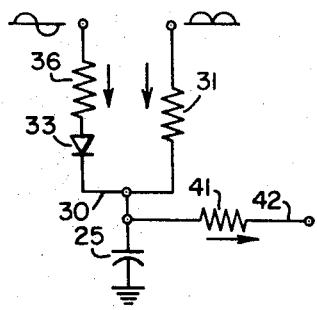
FIGS. 2A and 2B are fragmentary schematic circuit diagrams illustrating the reversal of current flow through a resistor connected to the power supply capacitor, as the resistor changes from a charging resistor to a discharging resistor after the controlled rectifier is fired.

Particular reference is made now to FIG. 2A. FIG. 2A shows how the currents through resistors 36 and 31, one being half wave rectified and the other being a full wave rectifier waveform, which add at lead 30 and are simultaneously applied to capacitor 25 and flow together through the resistor 41 to provide a regulated firing circuit voltage on lead 42.

Figure 2B:
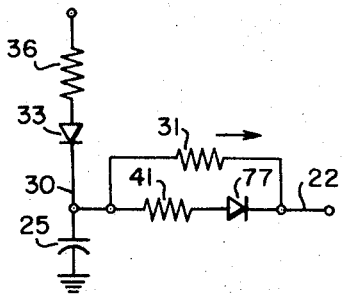

Particular reference is made now to FIG. 2B. While FIG. 2A showed current flows in two paths before firing and during the timing period, FIG. 2B shows current flows in the same circuit portions after firing of the controlled rectifier 80. The direction of current flow through resistor 31 is reversed and it has effectively connected in shunt therewith the series-connected resistor 41 and diode 77 to supply on lead 22 a holding current to the controlled rectifier anode 81.

As previously stated, another object of the invention was to provide for rapid reset if the power at terminals 11 and 12 is interrupted prior to timing out, that is, during the timing period. To this end, a low value of capacitance for the capacitor 25 is employed as previously mentioned. This causes the power supply voltage to fall rapidly which lowers the unijunction interbase voltage and which would cause undesirable firing of the unijunction transistor if timing capacitor 54 is not discharged even more rapidly than capacitor 25. This premature firing of the unijunction transistor must be prevented even though it would appear unnecessary since when alternating current power is interrupted there is no power available to energize the relay coil 16. If a momentary power interruption causes the unijunction transistor to fire and initiate conduction of the controlled rectifier, subsequent restoration of the alternating current power will sustain the conduction and cause the relay coil 16 to be energized.

We have solved this problem by providing rapid discharge of timing capacitor 54 which is initiated as soon as the regulated direct current voltage to the unijunction transistor decreases below its regulated value. This is accomplished by placing the base-emitter junction of transistor 48 in series with the Zener diode 44. Under normal conditions during the timing period and while capacitor 54 is charging, the Zener diode and the base-emitter junction of transistor 48, forming in effect an additional diode, both conduct and regulate the voltage supplied to the unijunction transistor 65. This base-to-emitter current keeps transistor 48 saturated which reverse biases diode 60 rendering it nonconductive. If the alternating current power is interrupted, the voltage across capacitor 25 falls and the current supplied through resistor 41 decreases. The regulated voltage is maintained until the base-emitter current of transistor 48 falls to zero. This causes transistor 48 to block removing the reverse bias from diode 60, and timing capacitor 54 is rapidly discharged through diode 60, lead 51, resistor 52, resistor 27 and lead 26. The rapid discharge permits rated accuracy to be obtained for resetting times as short as 250 milliseconds.

As previously stated, a further object of the invention was to provide fast reset after the timing out is completed in a normal manner. As previously stated, the goal set was a rated 2 percent timing accuracy after a reset time of 80 milliseconds if the controlled rectifier was previously conducting. We have provided this desired fast reset after timing out by providing that at the end of the time delay period the unijunction transistor fires and this fires the controlled rectifier 80. Diode 77 conducts and holds the unijunction supply voltage on lead 42 near zero potential. This prevents the timing capacitor 54 from recharging following its discharge through the unijunction transistor 65. Furthermore, transistor 48 is locked by this action that is, the voltage between leads 42 and 23 becoming near zero and timing capacitor 54 is fully discharged through diode 60 and resistors 27 and 52.

As previously stated, one of the objects of the invention was to provide for a long time delay without employing expensive and large components. The use of an electrolytic capacitor as the timing capacitor is undesirable because capacitor leakage currents make the timing interval unreliable and unstable with temperature variations. Capacitors of MYlar, while providing excellent stability, are limited to values of from 5 microfarads to 10 microfarads by economic considerations. The prior art circuits generally speaking require an extra transistor probably of the unijunction type to provide sampling pulses such for example as those circuits shown in FIGS. 13.31 and 13.32 of the aforementioned "Transistor Handbook."

We provide inexpensive long time delay by a circuit in which diode 62 and resistor 69, FIG. 1, isolate the emitter 64 of the unijunction transistor from the timing circuit. The sampling action is economically obtained without requiring an extra unijunction transistor by returning the lower end of the timing capacitor 54 to the junction between resistor 27 and capacitor 25. Pulses of somewhat less than 1 volt amplitude are produced across resistor 27 by the charging current pulses through capacitor 25. These pulses add to the ramp of voltage across the timing capacitor 54 and cause definite firing of the unijunction transistor 65 when the ramp voltage has risen to an adequate level.

As previously stated small size and low cost are achieved by using a transformerless design and using a new low cost controlled rectifier known in the trade as a C106B. Reliability is achieved by conservative design and preferably by the use of silicon semiconductors. Transient protection for the alternating current switch is provided by Zener diode 91 which conducts on transient peaks which exceed for example 200 volts. Spurious firing of the controlled rectifier is prevented by capacitor 93 and resistor 94 which provide $dv/dt$ suppression for the controlled rectifier. Capacitor 37 provides transient protection for diode 33.

Figure 3A:
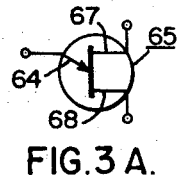
FIG. 3A shows unijunction transistor connections of assistance in describing the invention.
Figure 3B:
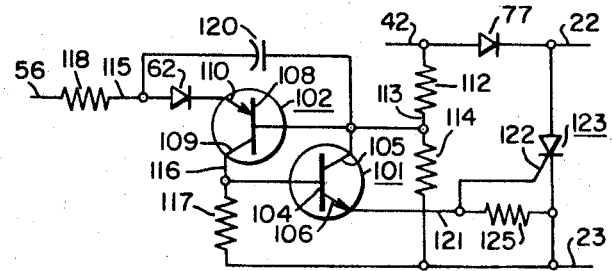
FIG. 3B shows a fragmentary portion of a modification of our invention in which complementary NPN and PNP transistors are substituted for the unijunction transistor of FIG. 1.

A second embodiment of our invention using a pair of complementary PNP and NPN transistors is shown in FIG. 3B in fragmentary form. FIG. 3A shows a unijunction transistor for ease of comparison. Certain key leads, these being leads 56, 42, 22, and 23, are shown in FIG. 3B with a pair of complementary NPN and PNP transistors generally designated 101 and 102 respectively connected in circuit, and it will be understood that the remainder of the complete timing circuit of FIG. 3B may be similar to tat shown in FIG. 1. NPN transistor 101 has a base 104, collector 105 and emitter 106, while PNP transistor 102 has a base 108, collector 109 and emitter 110. A voltage dividing network is formed between the leads 42 and 23 by resistor 112, lead 113 and resistor 114. Lead 113 is connected to the base 108 of transistor 102 and is directly connected to the collector 105 of transistor 101. Emitter 110 of transistor 102 is connected by way of diode 62, lead 115, and resistor 118 to lead 56. Resistor 118 may have a value of 470 ohms. Resistor 112 may have a value of 2.4 kilohms while resistor 114 may have a value of 4.7 kilohms. Capacitor 120 connects lead 115 to lead 113 and may have a value of 0.005 microfarads. The aforementioned collector of transistor 102 is connected by way of lead 116 and resistor 117 to lead 23. Resistor 117 may have a value of 220 kilohms. The aforementioned lead 116 is also directly connected to the base 104 of transistor 101 and the emitter 106 of transistor 101 is directly connected by lead 121 to the control element 122 of the controlled rectifier generally designated 123 having the anode thereof connected to lead 22 and the cathode thereof directly connected to lead 23. The controlled rectifier 123 may be a type known in the trade as C106B. The control element thereof is connected by way of resistor 125 and to lead 23. Resistor 125 may have a value of 100 ohms.

In the circuit of 3B the complementary transistors 101 and 102 perform the function of the single unijunction transistor 65 of FIG. 3A. As previously explained, when the voltage on emitter 64, FIG. 3A, reaches a specified fraction of the voltage between base 67 and base 68, the unijunction transistor 65 triggers or becomes conductive. In the circuit of FIG. 3B to which particular reference is made, the current limiting resistor 86 of FIG. 1 may be thought of as having been moved to the timing capacitor side of equivalent bitransistor circuit and replaced by resistor 118 where it operates in conjunction with capacitor 120 to reduce the sensitivity to triggering on high frequency noise. In FIG. 1, diode 85 was provided to provide a threshold to overcome the drop in resistor 73 but such diode is not needed in the circuit of FIG. 3B and has been eliminated.

Further summarizing some of the advantages of our circuit, it is small enough to fit on top of a relay to which it is to be attached, one known in the trade as a Westinghouse BF relay. It is accurate, inexpensive and reliable. It features quick resetting before and after timing out. The controlled rectifier of the circuit is not triggered by line transients nor from momentary power interruptions.

Further summarizing some of the important features of our invention, the method of charging the power supply capacitor from a full wave voltage obtained from the alternating current switch and from a half wave diode offers great advantages in improved performance. The automatic switching of a resistor, that is, resistor 31 from a capacitor charging resistor to a capacitor discharging resistor when the controlled rectifier fires provides a circuit having greater simplicity and one in which a single component performs dual functions heretofore requiring dual components. We provide means for resetting the timing capacitor using a transistor having its base-emitter junction in series with a voltage regulating Zener diode which controls the voltage to the timing capacitor. We use a power supply capacitor charging current to generate voltages for pulsing or sampling the voltage on the timing capacitor.

It will be understood that when terminals 11 and 12 are first connected to the alternating current line, a small current of order of 5 milliamperes flows through coil 16 before the controlled rectifier fires. This small current supplies input power to the full wave rectifier 14, which supplies an output for charging capacitor 25 and thereafter charging timing capacitor 54. An initial inrush current trough coil 16 may reach 30 milliamperes. The full current in coil 16 required to activate the relay may be 600 milliamperes. The relay may be a type known in the trade as a Westinghouse BF.

The foregoing written description and drawings are illustrative and exemplary only and are not to be interpreted in a limiting sense.

We claim:

1. In on-delay timing apparatus comprising first and second terminals adapted to be connected to an alternating current line; a full wave rectifier having one input terminal thereof connected to one of said terminals, the other input of the full wave rectifier being adapted to be connected by coil means to the other terminal of the alternating current line; a controlled rectifier having the anode-cathode path thereof connected across the output of the full wave rectifier, said controlled rectifier when fired causing substantial current to flow in said coil; a resistance voltage dividing network including a unijunction transistor and resistance means connected to the bases of the unijunction transistor, and an isolating diode all in series across the output of the full wave rectifier; means connecting one of the bases of the unijunction transistor to the control element of the controlled rectifier whereby the controlled rectifier is fired when the unijunction transistor becomes conductive; an RC timing circuit operatively connected to the emitter of the unijunction transistor and causing the unijunction transistor to fire when the voltage across the capacitor of the timing circuit attains a predetermined value, a charging power supply capacitor operatively connected to the RC timing circuit and to the dividing network by way of the junction of the diode and the resistance means and supplying a direct current voltage thereto, circuit means connecting the charging capacitor across the full wave rectifier for supplying a full wave rectified direct charging current to the charging capacitor, and other circuit means including diode means connecting the charging capacitor across the alternating current line for supplying a half wave rectified charging current to the charging capacitor.

2. Apparatus according to claim 1 in which the means operatively connecting the charging capacitor to the timing capacitor of the RC timing circuit includes an additional transistor, a voltage regulating Zener diode and circuit means connecting the base-emitter junction of the additional transistor in series with said voltage regulating Zener diode and operatively across said charging capacitor, a disconnecting diode connecting the timing capacitor of the RC timing circuit to the collector of the additional transistor, resistance means connecting the disconnecting diode and the collector to one side of the charging capacitor, said disconnecting diode being reverse-biased by the voltage on said collector while the timing capacitor is charging, the interruption of the alternating current at the terminals connected to the alternating current line before the timing capacitor is charged to a voltage which causes the controlled rectifier to become conductive causing said charging capacitor to quickly discharge and causing said reverse bias to be removed whereby a quick discharge path for the timing capacitor through said disconnecting diode is completed thereby resetting the timing circuit for a timing operation.

3. Apparatus according to claim 1 in which the circuit means connecting the charging capacitor across the output of the full wave rectifier includes a resistor which forms a charging resistor until the controlled rectifier fires, a further diode, and other circuit means automatically activated when the controlled rectifier fires to cause said charging capacitor to discharge through a path including said last-named resistor and said further diode and to supply current to the controlled rectifier.

4. Apparatus according to claim 1 including in addition circuit means operatively connected to the power supply charging capacitor and to the timing capacitor for utilizing charging current to the power supply capacitor to generate voltage pulses for pulsing the timing capacitor.

5. On-delay timing apparatus comprising, in combination, first and second terminals adapted to be connected to an alternating current line, a full wave rectifier having one input thereof connected to one of said terminals, the other input of the full wave rectifier being adapted to be connected to the other of said terminals by relay coil means, a controlled rectifier having the anode-cathode path thereof connected across the output of said full wave rectifier, the controlled rectifier when fired causing substantial current to flow through said relay coil means and timing circuit means connecting the control element of the controlled rectifier to the alternating current line, the timing circuit means initiating a timing operation when the first and second terminals are connected to the line, the timing circuit means including two capacitors each of which must be charged to a predetermined voltage to initiate the firing of the controlled rectifier, one of said capacitors being operatively connected to the full wave rectifier to have a full wave rectified direct current charging voltage applied thereto, diode means connecting said one capacitor to the alternating current line whereby an additional half wave charging voltage is applied to said one capacitor, RC circuit means connected across the one capacitors including the other of said capacitors employed in the timing operation, and circuit means including a unijunction transistor connecting the other capacitor to the controlled rectifier, and unijunction transistor being fired when the voltage across the other capacitor attains a predetermined value, said last-named circuit means including resistance means connecting one of the bases of the unijunction transistor to the control element of the controlled rectifier to supply gating current to the controlled rectifier when the unijunction transistor fires.

6. On-delay timing apparatus comprising, in combination, first and second terminals adapted to be connected to an alternating current line, a full wave rectifier having one input thereof connected to one of said terminals connected to the line, the other input of the full wave rectifier being adapted to be connected by way of a relay coil to the other terminal connected to the line, a controlled rectifier having the anode-cathode path thereof operatively connected across the output of the full wave rectifier and when fired causing current to flow through the relay coil, a power supply charging capacitor, circuit means including resistor means connecting the power supply capacitor across the output of the full wave rectifier to be charged by a full wave rectified direct current, other circuit means including diode means operatively connecting the charging capacitor to the alternating current line to have a half wave rectified charging current supplied thereto, circuit means including Zener diode means for regulating the voltage across the power supply capacitor, a timing circuit including a timing resistor and a timing capacitor, said timing capacitor being charged by current from the power supply capacitor, and firing circuit means including a pair of complementary NPN and PNP transistors connecting the timing capacitor to the controlled rectifier to fire the controlled rectifier when the voltage across the timing capacitor attains a predetermined value.

7. Apparatus according to claim 6 including a voltage divider including in series a diode, a first resistor and a second resistor connected across the output terminals of the full wave rectifier, the emitter of the PNP transistor being operatively connected to the timing capacitor, the base of the PNP transistor and the collector of the NPN transistor being connected between the first and second resistors, the base of the NPN transistor being connected to the collector of the PNP transistor and further connected by way of a further resistor to one terminal of the output of the full wave rectifier, the emitter of said NPN transistor being connected to the control element of the controlled rectifier.

8. Apparatus according to claim 7 including in addition an isolating diode in series with the emitter of said PNP transistor.

9. Apparatus according to claim 6 in which the power supply capacitor is automatically discharged through the same resistor means that charges said capacitor from the output of the full wave rectifier after the controlled rectifier has been fired.

10. Apparatus according to claim 6 including in addition further Zener diode means connected across the output of the full wave rectifier for protecting the controlled rectifier from voltage transients.

11. Apparatus according to claim 5 including a capacitor connected across the half wave charging diode for the power supply capacitor to protect said last-named diode from transients.

12. Apparatus according to claim 1 wherein he charging capacitor is operatively connected to the RC timing circuit by circuit means including a Zener diode for regulating the charging voltage to the timing capacitor.

13. Apparatus according to claim 6 including in addition first and second back to back diodes, both of said diodes having their anodes operatively connected to the timing circuit at the junction between the timing resistor and the timing capacitor, an additional transistor, other circuit means connecting the additional transistor across the power supply capacitor, the cathode of the first diode being connected to the collector of the additional transistor, the other circuit means including resistance means operatively connecting the collector and cathode of the first diode to that terminal of the timing capacitor not connected to the anode of the first diode, the additional transistor normally maintaining a reverse bias voltage of sufficient magnitude across said last-named resistance means and on the cathode of the first diode whereby the first diode is normally blocked while the timing capacitor is being charged, said reverse bias voltage falling to a lower value whereby said first diode provides a discharge path for the timing capacitor if 14. In on-delay timing apparatus for energizing a coil a predetermined time after the apparatus is connected to an alternating current line, in combination, an alternating current switch including a full wave rectifier having output terminals and input terminals, a controlled rectifier having the anode-cathode path thereof connected across the output terminals of the full wave rectifier, the input terminals of the full wave rectifier being operatively connected to the line by way of the coil, main circuit means operatively connected to the line and to the full wave rectifier for developing a normally regulated pulsating direct current voltage between two circuit points, first, second and third circuit means providing three parallel paths between said two circuit points, the first circuit means including in series a timing resistor and a timing capacitor, the second circuit means including a Zener diode and a transistor having the base-emitter junction thereof in series with the Zener diode, said Zener diode and base-emitter junction being conductive while the regulated direct current voltage exists between the two circuit points, said transistor being saturated while the base-emitter junction thereof conducts, a diode connecting the junction between the timing resistor and the timing capacitor to said transistor, said transistor while saturated reverse-biasing said diode thereby preventing the timing capacitor from discharging through said diode, said third circuit means including resistance means and the base-eitter-base path of unijunction transistor, said last-named emitter being operatively connected to the junction between the timing resistor and the timing capacitor, said unijunction transistor firing when the voltage across the timing capacitor attains a predetermined value in accordance with the base voltages of the unijunction transistor, and means connecting one of the bases of the unijunction transistor to the control element of the controlled rectifier for firing the controlled rectifier when the unijunction transistor fires.

15. On-delay timing apparatus according to claim 16 including in addition another diode connecting said two circuit points across the anode-cathode of the controlled rectifier whereby when the controlled rectifier becomes conductive the voltage across the two circuit points falls to a value near zero.

16. Electrical circuit means including a capacitor for regulating the potential difference at two circuit points and obtaining a utilization signal until the actual voltage between the circuit points differs from the desired regulated value by a predetermined amount comprising, in combination, a transistor having a base, emitter and collector, a load resistor connected to said collector, a Zener diode, and means connecting the base-emitter junction of the transistor and the Zener diode in series across the two circuit points, the Zener diode having a selected Zener voltage and being so poled, and the transistor being selected, whereby substantial current flows through the emitter-base junction and the Zener diode while the voltage between the two points has its regulated value, the emitter-base junction current saturating the transistor and causing a utilization signal at the collector thereof, said utilization signal continuing after a cessation of voltage at the two circuit points until the emitter-base current falls to substantially zero value.

17. In an electrical circuit having an alternating current switch including a full wave rectifier having an input and an output adapted to have the input thereof connected by current responsive apparatus to an alternating current line and having a controlled rectifier connected across the output of the full wave rectifier which controlled rectifier while conductive causes actuating current to flow through the current responsive apparatus, having a timing capacitor and means triggered when the voltage across the timing capacitor attains a predetermined value for supplying a gating signal to the controlled rectifier to gate the controlled rectifier on, the improvement which includes a power supply capacitor for supplying charging current to the timing capacitor, circuit means connecting the power supply capacitor, output of the full wave rectifier to apply a full wave rectified direct current voltage to the power supply capacitor to charge the same, other circuit means including a half wave rectifier connecting the power supply capacitor to the alternating current line for obtaining and applying to the power supply capacitor a half wave rectified direct current voltage for charging the same, and other circuit means including a diode for removing the full wave rectified voltage from the charging capacitor after the controlled rectifier is gated on to reduce the power dissipation in the controlled rectifier.

18. An electrical circuit according to claim 17 wherein after the controlled rectifier is gated on said half wave rectified direct current voltage is applied to the controlled rectifier to supply a holding current therefor.

19. On-delay time delay apparatus comprising in combination, an alternating current switch including a full wave rectifier adapted to have the input thereof connected by coil means to an alternating current line and having a controlled rectifier connected across the output of the full wave rectifier, a power supply capacitor, circuit means for charging the power supply capacitor, means including a series connected transistor and Zener diode for regulating the voltage across the power supply capacitor, a timing circuit including in series a timing capacitor and a timing resistor operatively connected across the power supply capacitor, means forming a discharge path for the timing capacitor, said voltage regulating means including means for blocking said discharge path while the timing capacitor is charging and the power supply voltage has its regulated value, and triggering means operatively connecting the power supply capacitor to the controlled rectifier for triggering the controlled rectifier on when the voltage across the timing capacitor attains a predetermined value.

20. On-delay time delay apparatus according to claim 19 in which the means for regulating the voltage across the power supply capacitor includes a transistor having a base, collector and emitter, and the Zener diode is connected in series with the base-emitter junction of the transistor, the series-connected base-emitter junction and Zener diode being operatively connected across the power supply capacitor.

21. On-delay time delay apparatus according to claim 20 in which the discharge path for the timing capacitor includes a diode, and said means for blocking the discharge path includes means for obtaining a reverse-biasing voltage from the collector of said transistor and applying said reverse-biasing voltage to said diode.